US011908261B2

(12) United States Patent
Lin et al.

(10) Patent No.: US 11,908,261 B2
(45) Date of Patent: Feb. 20, 2024

(54) INTELLIGENT ELECTRONIC LOCK, INTELLIGENT ELECTRONIC LOCK ASSEMBLY AND SUITCASE

(71) Applicant: Smart Approach CO., LTD., Zhubei (TW)

(72) Inventors: Hsin-Lung Lin, Zhubei (TW); Cheng-Tang Lin, Zhubei (TW)

(73) Assignee: SMART APPROACH CO., LTD., Zhubei (TW)

( * ) Notice: Subject to any disclaimer, the term of this patent is extended or adjusted under 35 U.S.C. 154(b) by 60 days.

(21) Appl. No.: 17/699,273

(22) Filed: Mar. 21, 2022

(65) Prior Publication Data

US 2023/0230435 A1 Jul. 20, 2023

(30) Foreign Application Priority Data

Jan. 19, 2022 (TW) ................................ 111102101

(51) Int. Cl.
*G07C 9/00* (2020.01)

(52) U.S. Cl.
CPC ..... *G07C 9/00944* (2013.01); *G07C 9/00912* (2013.01); *G07C 2009/0096* (2013.01); *G07C 2009/00769* (2013.01)

(58) Field of Classification Search
CPC ............ G07C 9/00944; G07C 9/00912; G07C 2009/00769; G07C 2009/0096
USPC ........................................................ 340/5.61
See application file for complete search history.

(56) References Cited

U.S. PATENT DOCUMENTS 2,938,371 A * 5/1960 Check ................ E05B 65/5261 292/285
3,478,547 A * 11/1969 Constable ........... E05B 65/5269 292/DIG. 49
4,395,891 A * 8/1983 Remington .......... A44B 19/301 70/68
4,559,880 A * 12/1985 Lacka ....................... E05G 1/00 109/51

(Continued)

FOREIGN PATENT DOCUMENTS

CA 2929266 A1 * 7/2016 ............ G08B 21/24

*Primary Examiner* — Nam V Nguyen
(74) *Attorney, Agent, or Firm* — Locke Lord LLP; Tim Tingkang Xia, Esq.

(57) ABSTRACT

An intelligent electronic lock for receiving an identification signal and an induction signal includes a housing, a wireless sensor, a current divider, a microcontroller, a driver and at least one blocking element. The wireless sensor, the current divider, the microcontroller and at least one blocking element are disposed in the housing. An induction coil of the wireless sensor senses the induction signal to generate an induction current. The wireless sensor receives the identification signal. The current divider distributes the induction current to the microcontroller and the driver. The microcontroller obtains a target identification information from the identification signal. The microcontroller compares the target identification information with a reference identification information to output a control signal. The driver drives at least one blocking element to move between an unlocking position and a locking position. Based on the aforementioned description, the intelligent electronic lock is able to operate without power.

8 Claims, 6 Drawing Sheets

(56) References Cited

U.S. PATENT DOCUMENTS

| | | | | | |
|---|---|---|---|---|---|
| 5,987,818 | A * | 11/1999 | Dabideen | E05B 63/22 | 292/144 |
| 6,510,593 | B1 * | 1/2003 | Kim | A44B 19/301 | 70/68 |
| 7,073,233 | B2 * | 7/2006 | Leva | A44B 19/26 | 24/386 |
| 8,661,861 | B2 * | 3/2014 | Lai | E05B 37/12 | 70/284 |
| 10,798,998 | B2 * | 10/2020 | Ritchie | A44B 19/301 | |
| 2004/0083782 | A1 * | 5/2004 | Lantz | E05B 39/02 | 70/423 |
| 2008/0295300 | A1 * | 12/2008 | Jans | A44B 19/301 | 24/385 |
| 2016/0215524 | A1 * | 7/2016 | Yoshikawa | E05B 47/0002 | |
| 2020/0323314 | A1 * | 10/2020 | Wan | E05B 35/105 | |

* cited by examiner

INTELLIGENT ELECTRONIC LOCK, INTELLIGENT ELECTRONIC LOCK ASSEMBLY AND SUITCASE

CROSS-REFERENCE TO RELATED APPLICATIONS

This non-provisional application claims priority under 35 U.S.C. § 119(a) on Patent Application No(s). 111102101 filed in Taiwan on Jan. 19, 2022, the entire contents of which are hereby incorporated by reference.

BACKGROUND

1. Technical Field

This disclosure relates to a lock, and particularly relates to an intelligent electronic lock, an intelligent electronic lock assembly and a suitcase without power.

2. Related Art

On vacation, people usually take a suitcase to do domestic travel or travel abroad. In order to prevent the suitcase from being stolen, people would utilize a mechanical lock (such as a combination lock) to lock the suitcase. However, the mechanical lock is easy to be deliberately destroyed and thus there are concerns in safety of the mechanical lock.

As technology is rapidly developed, an electronic lock rises. The electronic lock is applied to each aspect of daily life, such as a door lock, a locker or a suitcase lock. However, when a traveler utilizes the electronic lock on the suitcase at the airport, a customs officer asks the traveler to detach the electronic lock because the electronic lock is still an electronic product with power and is limited to Civil Aviation Act and it leads to troubles of the traveler. Besides, when the power (such as a battery) of the electronic lock is out and there is no power to provide to electrical components (such as a microcontroller or a driver) of the electronic lock, the electronic lock does not operate normally and it leads that people are unable to use the electronic lock.

SUMMARY

In light of the aforementioned description, the present disclosure provides an intelligent electronic lock, an intelligent electronic lock assembly and a suitcase being able to operate without power to solve a problem of applying the electronic lock to the suitcase.

According to one or more embodiment of the present disclosure, an intelligent electronic lock is configured to receive a wireless signal including an identification signal and an induction signal. The intelligent electronic lock includes a housing, a wireless sensor, a current divider, a microcontroller, a driver and at least one blocking element. The wireless sensor is disposed in the housing, is configured to receive the identification signal and includes an induction coil which senses the induction signal to generate an induction current. The current divider is electrically connected to the wireless sensor and distributes the induction current. The microcontroller is disposed in the housing, is electrically connected to the wireless sensor and the current divider. The microcontroller is provided with reference identification information and is operated by part of the induction current. The microcontroller obtains target identification information from the identification signal and compares the target identification information with the reference identification information to output a control signal. The driver is disposed in the housing, is electrically connected to the microcontroller and the current divider. The driver is operated by part of the induction current. At least one blocking element is disposed in the housing and is mechanically connected to the driver. The driver drives at least one blocking element to move between a locking position where the at least one blocking element protrudes out of the housing and an unlocking position where the at least one blocking element retracts in the housing according to the control signal.

According to one or more embodiment of the present disclosure, an intelligent electronic lock assembly is configured to receive a wireless signal including an identification signal and an induction signal and includes the aforementioned intelligent electronic lock and the base. The base includes a groove where the intelligent electronic lock is separably disposed and at least one hole disposed on a sidewall of the groove. At least one blocking element is separated from the at least one hole when being at the unlocking position, and the at least one blocking element is engaged with the at least one hole when being at the locking position.

According to one or more embodiment of the present disclosure, a suitcase includes a case body and the aforementioned intelligent electronic lock assembly. The case body includes a zipper chain. The aforementioned intelligent electronic lock assembly is disposed on the zipper chain.

In view of the above description, the intelligent electronic lock and the intelligent electronic lock assembly disclosed by the present disclosure utilizes the wireless sensor to sense the induction signal to generate the induction current, the induction current is distributed to the microcontroller and the driver by the current divider and is a power source of the microcontroller and the driver. Hence, there is no need to dispose the power (such as a battery) to make the microcontroller and the driver operate to elevate convenience of the intelligent electronic lock in use. The suitcase disclosed by the present disclosure with the aforementioned intelligent electronic lock assembly and has no disposal of power to conform to Civil Aviation Act.

DETAILED DESCRIPTION

Figure 1:
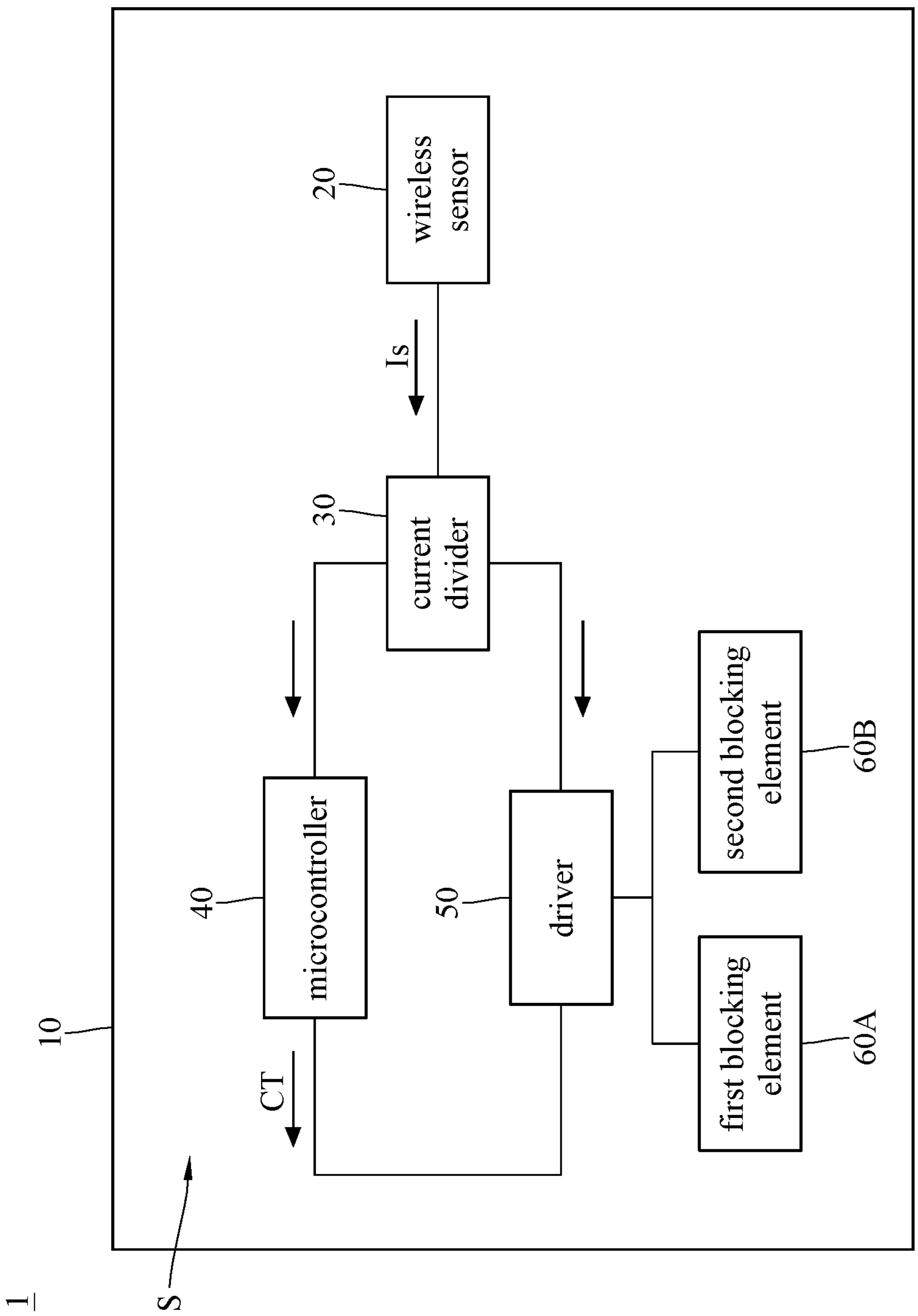
FIG. 1 illustrates a system block diagram of an intelligent electronic lock according to one embodiment of the present disclosure.
Figure 2A:
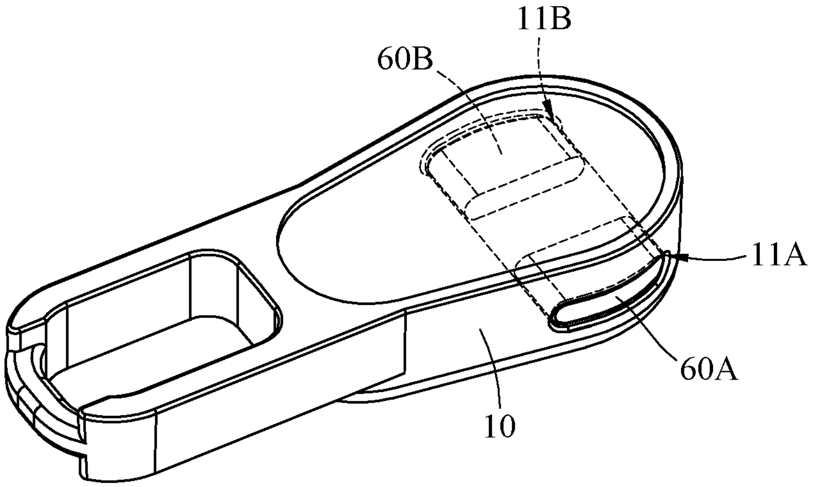
FIG. 2A illustrates a schematic diagram of an intelligent electronic lock at the unlocking position according to one embodiment of the present disclosure.
Figure 2B:
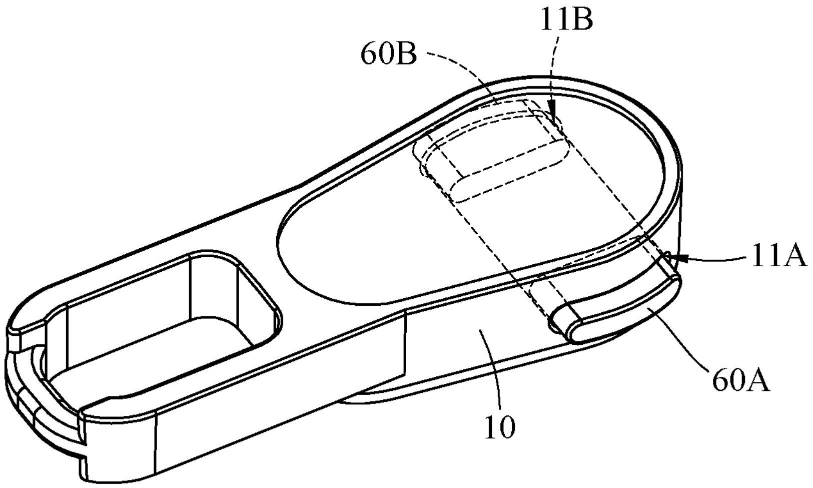
FIG. 2B illustrates a schematic diagram of an intelligent electronic lock at the locking position according to one embodiment of the present disclosure.

Please refer to FIG. 1 to FIG. 2B, which illustrate a system block diagram of the intelligent electronic lock according to one embodiment of the present disclosure, a schematic diagram of the intelligent electronic lock at the unlocking position according to one embodiment of the present disclosure and a schematic diagram of the intelligent electronic lock at the locking position according to one embodiment of the present disclosure. As illustrated in FIG. 1, the intelligent electronic lock 1 includes is configured to receive a wireless signal including an identification signal and an induction signal. The intelligent electronic lock 1 includes a housing 10, a wireless sensor 20, a current divider a microcontroller 40, a driver 50 and at least one blocking element. The wireless sensor is disposed in the housing 10 and is configured to receive the identification signal. The wireless sensor 20 includes an induction coil which senses the induction signal to generate an induction current Is. The current divider 30 is electrically connected to the wireless sensor 20 and distributes the induction current Is. The microcontroller 40 is disposed in the housing 10 and is electrically connected to the wireless sensor 20 and the current divider 30. The microcontroller 40 is provided with reference identification information and is operated by part of the induction current Is. The microcontroller 40 obtains target identification information from the identification signal and compares the target identification information with the reference identification information to output a control signal CT. The driver 50 is disposed in the housing 10 and is electrically connected to the microcontroller 40 and the current divider 30. The driver 50 is operated by part of the induction current Is. The number of at least one blocking element is two and two blocking element includes a first blocking element 60A and a second blocking element 60B. The first blocking element 60A and the second blocking element 60B are disposed in the housing 10 and are mechanically connected to the driver 50. The driver 50 drives the first blocking element 60A and the second blocking element 60B to move between a locking position where the first blocking element 60A and the second blocking element 60B protrude out of the housing 10 and an unlocking position where the first blocking element and the second blocking element 60B retract in the housing 10 according to the control signal.

In the present embodiment, the housing 10 is provided with an accommodating space S, a first through hole 11A and a second through hole 11B. The first through hole 11A and the second through hole 11B are disposed on two opposite sides of the housing and are connected to the accommodating space S. The wireless sensor 20, the current divider 30, the microcontroller 40 and the driver 50 are disposed in the accommodating space S.

In the aforementioned embodiment, the number of the blocking element is two and the number of through holes is two, but the number of the blocking element and the number of through holes are not limited to the present disclosure. The number of the blocking element may be one and the number of through hole may be one. The number of through holes is set according to the number of the blocking element.

The configuration of the intelligent electronic lock is taken as one example. The housing 10 is constituted by two ellipse cases. When the two ellipse cases are engaged with each other, the inside housing 10 forms the accommodating space S. A printed circuit board is disposed in the accommodating space S. A signal processing circuit of the wireless sensor 20, the current divider 30, the microcontroller 40 and the driver 50 are disposed on the printed circuit board. The induction coil of the wireless sensor 20 is disposed in the accommodating space S and above the printed circuit board. The first blocking element and the second blocking element 60B are mechanically connected to the driver 50 respectively. The first through hole 11A and the second through hole 11B are disposed on one of the two ellipse cases and respectively correspond to positions of the first blocking element 60A and the second blocking element 60B. The first through hole 11A can provide the first blocking element 60A to pass through, and the second through hole 11B can provide the second blocking element 60B to pass through.

The configuration of the intelligent electronic lock is taken as another example. The housing 10 is constituted by two square cases. When the two square cases are engaged with each other, the inside housing 10 forms the accommodating space S. A printed circuit board is disposed in the accommodating space S. A signal processing circuit of the wireless sensor 20, the current divider 30 and the microcontroller 40 are integrated into one sensing chip. The sensing chip and the driver 50 are disposed on the printed circuit board. The induction coil of the wireless sensor 20 is disposed in the accommodating space S and is located between sidewalls of the housing 10. The number of the blocking element is one and the number of through hole is one. The blocking element is adjacent to an engaging position of the two square cases. The through hole corresponds to the blocking element and is disposed at the engaging position of the two square cases.

The wireless signal may be a Bluetooth signal for example, and the Bluetooth signal is output by a mobile device. The driver 50 may be a motor. The aforementioned wireless signal and the driver 50 are merely explained, but are not limited to an illustration scope of the present disclosure.

It needs to be mentioned that the current divider 30 distributes the induction current Is to the microcontroller 40 and the driver 50 because operation currents of the microcontroller 40 and the driver 50 are different. For example, the current divider 30 provides 1.5A of the operation current to the microcontroller 40, and the current divider 30 provides 3A of the operation current to the driver 50.

For example, when the mobile device approaches the induction coil and the induction coil senses the Bluetooth signal transmitted by the mobile device, the induction coil generates the induction current Is and the current divider 30 distributes the induction current Is to the microcontroller 40 and the driver 50 to provide the microcontroller 40 and the driver 50 to operate; when the mobile device is away from the induction coil and thus the induction coil does not sense the Bluetooth signal transmitted by the mobile device, the current divider 30 does not transmit an electrical power to the microcontroller 40 and the driver 50 because the induction coil does not generate the induction current Is.

As illustrated in FIG. 2A, when the first blocking element 60A and the second blocking element 60B are at their corresponding unlocking positions, the first blocking element 60A and the second blocking element 60B are in the accommodating space S and do not pass through the first through hole 11A and the second through hole 11B. In other words, the first blocking element 60A and the second blocking element 60B are inside of the housing 10. As illustrated in FIG. 2B, when the first blocking element 60A and the second blocking element 60B are at their corresponding locking positions, the first blocking element 60A and the second blocking element 60B pass through the first through hole 11A and the second through hole 11B and the first blocking element 60A and the second blocking element 60B protrude from an outer surface of the housing 10. In other words, the first blocking element 60A and the second blocking element 60B are outside of the housing 10.

When the first blocking element 60A and the second blocking element 60B are at their corresponding unlocking positions, the microcontroller 40 receives the identification signal and obtains the target identification information from the identification signal. The microcontroller 40 compares the target identification information with the reference identification information. When the microcontroller 40 determines that the target identification information matches the reference identification information, the microcontroller 40 output the control signal to the driver 50 and the first blocking element and the second blocking element 60B are driven by the driver 50 and respectively move to the first through hole 11A and the second through hole 11B. Afterwards, the first blocking element 60A and the second blocking element 60B pass through the first through hole 11A and the second through hole 11B and are outside of the housing 10. When the first blocking element 60A and the second blocking element 60B are at their corresponding locking positions, the microcontroller 40 receives the identification signal and obtains the target identification information from the identification signal. The microcontroller 40 compares the target identification information with the reference identification information. When the microcontroller 40 determines that the target identification information matches the reference identification information, the first blocking element 60A and the second blocking element 60B are driven by the driver 50 and respectively retract from the outside housing 10 to the accommodating space S. Afterwards, the first blocking element 60A and the second blocking element 60B are in the accommodating space S and are inside of the housing 10.

When the microcontroller 40 determines that the target identification information does not match the reference identification information, the first blocking element 60A and the second blocking element 60B remain being at the locking position or the unlocking position.

Figure 3:
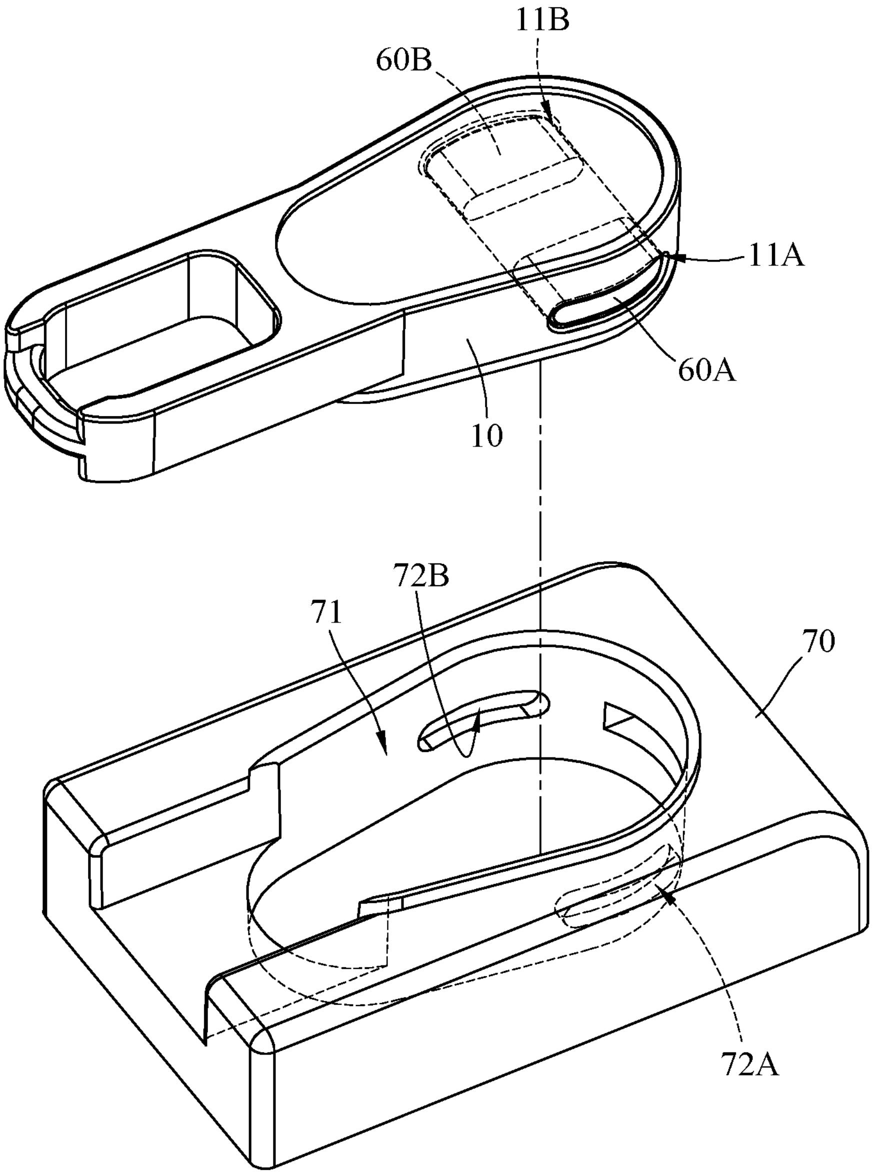
FIG. 3 illustrates a configuration diagram of an intelligent electronic lock assembly according to one embodiment of the present disclosure.

Please refer to FIG. 3, which illustrates a configuration diagram of the intelligent electronic lock assembly according to one embodiment of the present disclosure. As illustrated in FIG. 3, the intelligent electronic lock assembly includes the intelligent electronic lock 1 and a base 70. The configuration of intelligent electronic lock 1 has been described in the above paragraphs and would not be repeated. The base 70 includes a groove 71 and at least one hole. The intelligent electronic lock 1 is separably disposed in the base 70. At least one hole is disposed on a sidewall of the groove 71. Specifically, the intelligent electronic lock 1 may be separated from the based, and the intelligent electronic lock 1 may be disposed in the groove 71 and may be combined with the base 70.

In the present embodiment, the number of the hole is two and includes a first hole 72A and a second hole 72B. Positions of the first hole 72A and the second hole 72B are different. The first hole 72A and the second hole 72B respectively correspond to the first blocking element 60A and the second blocking element 60B. The number of the hole is equal to the number of the blocking element. For example, the number of the blocking element is three and the number of the hole is three. The number of the hole may be adjusted according to the number of the blocking element and is not limited thereto.

Figure 4A:
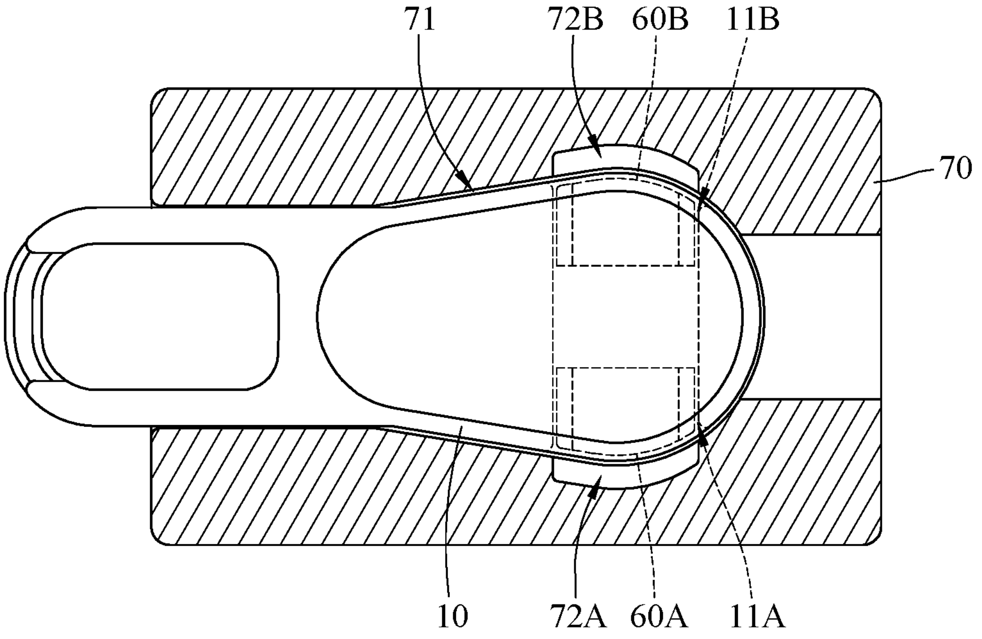
FIG. 4A illustrates a schematic diagram of an intelligent electronic lock assembly at the unlocking position according to one embodiment of the present disclosure.
Figure 4B:
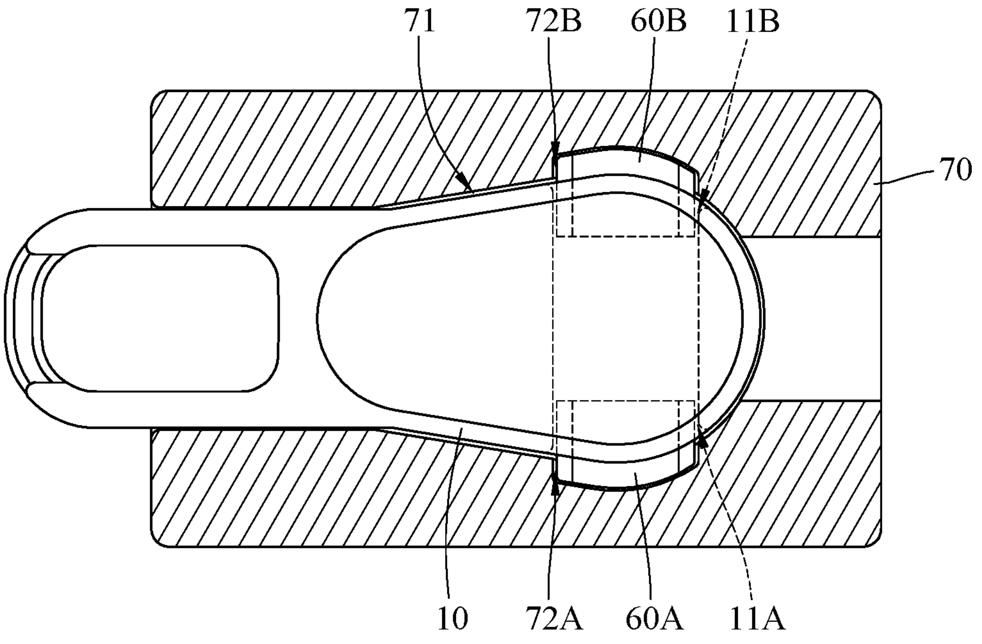
FIG. 4B illustrates a schematic diagram of an intelligent electronic lock assembly at the locking position according to one embodiment of the present disclosure.

Please refer to FIG. 4A and FIG. 4B, which illustrates a schematic diagram of the intelligent electronic lock assembly at the unlocking position according to one embodiment of the present disclosure and a schematic diagram of the intelligent electronic lock assembly at the locking position according to one embodiment of the present disclosure. As illustrated in FIG. 4A, the intelligent electronic lock 1 is disposed in the groove 71. When the first blocking element 60A and the second blocking element 60B are at their corresponding unlocking positions, the first blocking element 60A and the first hole 72A are separated, the second blocking element 60B and the second hole 72B are separated and the intelligent electronic lock 1 is easy to be separated from the base 70. As illustrated in FIG. 4A, when the first blocking element 60A and the second blocking element 60B are at their corresponding locking positions, the first blocking element 60A is engaged with the first hole 72A, the second blocking element 60B is engaged with the second hole 72B and the intelligent electronic lock 1 and the base 70 are combined closely.

Figure 5:
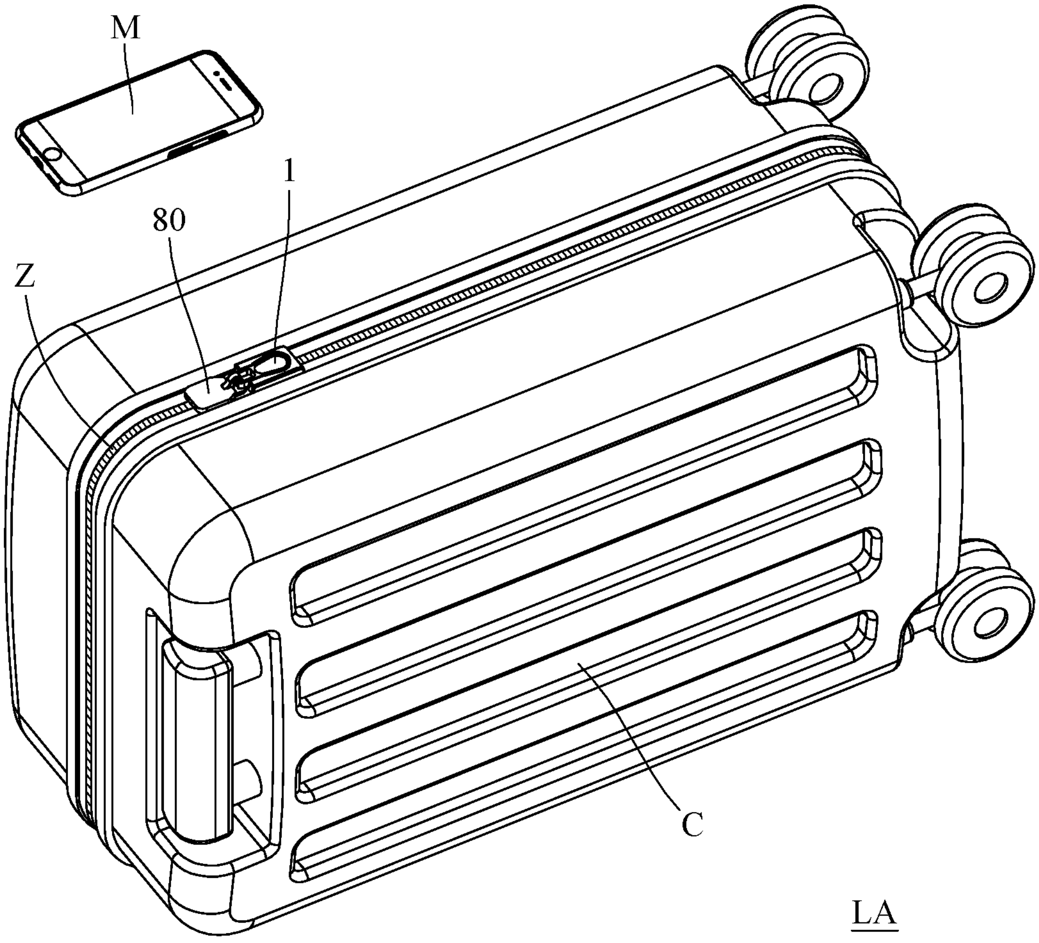
FIG. 5 illustrates a configuration diagram of a suitcase according to one embodiment of the present disclosure.

Please refer to FIG. 5, which illustrates a configuration diagram of the suitcase according to one embodiment of the present disclosure. As illustrated in FIG. 5, the suitcase LA includes a case body C and the intelligent electronic lock assembly. The case body C includes a zipper chain Z, and the intelligent electronic lock assembly is disposed on the zipper chain Z. Specifically, the case body C is constituted by two rectangle cases and the zipper chain Z is disposed at an engaging position between two rectangle cases. A user may utilize a mobile device M to perform a match on the intelligent electronic lock assembly to do a locking motion and an unlocking motion on the intelligent electronic lock assembly. The mobile device M may be a cell phone for example and is merely for explanation, but is not limited to an illustration scope of the present disclosure.

Figure 6A:
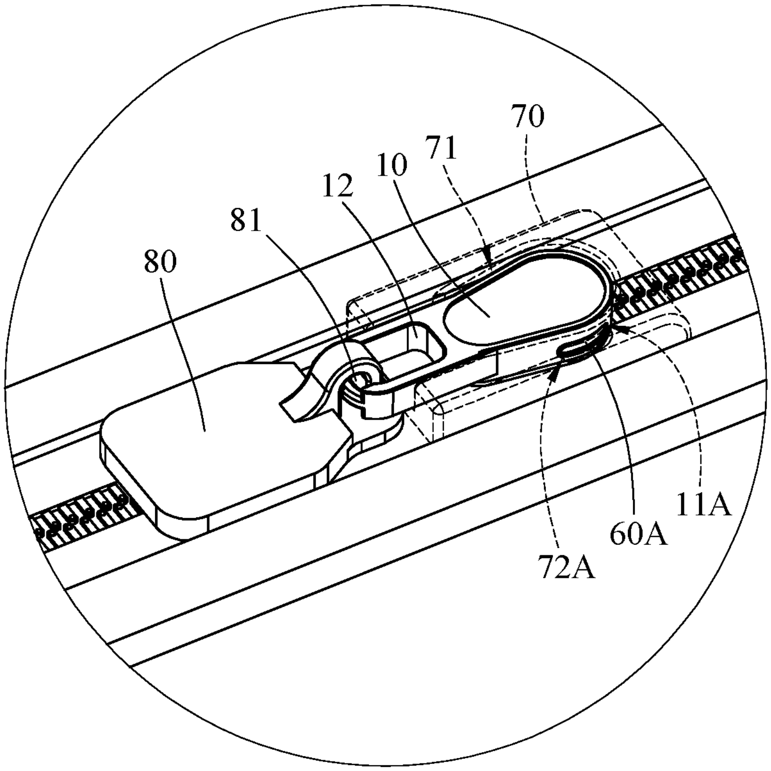
FIG. 6A illustrates a schematic diagram of a suitcase at the unlocking position according to one embodiment of the present disclosure.
Figure 6B:
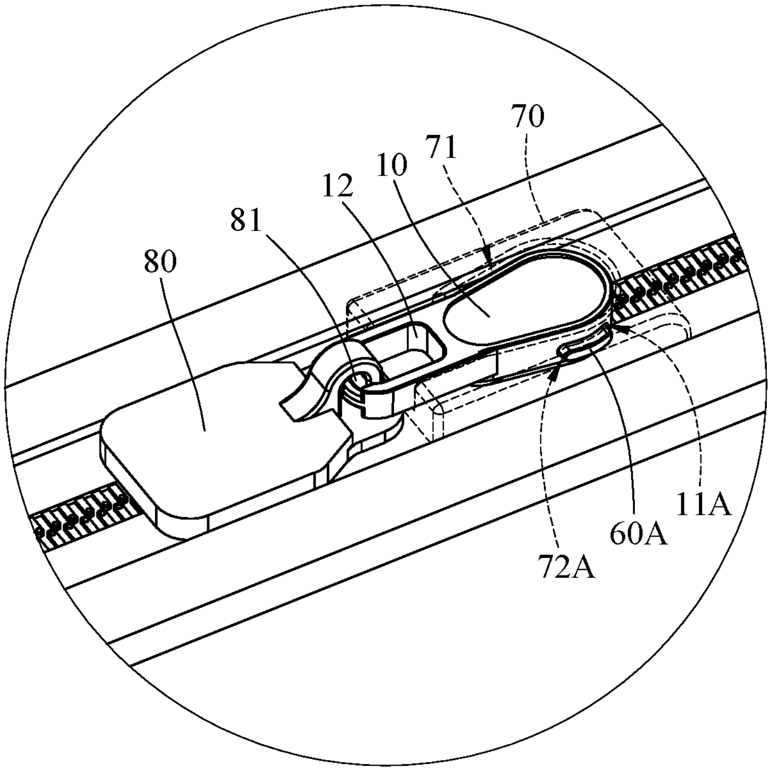
FIG. 6B illustrates a schematic diagram of a suitcase at the locking position according to one embodiment of the present disclosure.

Please refer to FIG. 6A and FIG. 6B, which illustrates a schematic diagram of the suitcase at the unlocking position according to one embodiment of the present disclosure and a schematic diagram of the suitcase at the locking position according to one embodiment of the present disclosure. As illustrated in FIG. 6A and FIG. 6B, in collaboration with FIG. 5, the suitcase LA further includes a slider 80. The slider 80 is slidably disposed on the zipper chain Z and the intelligent electronic lock 1 is rotatably disposed on the slider 80. Specifically, the slider 80 slides on the zipper chain Z, the intelligent electronic lock 1 serves as a pull tab of the slider 80 and a ring part 12 of the housing 10 is fastened by a ring hole 81 of the slider 80. The intelligent electronic lock 1 may rotate respective to the slider 80.

In the present embodiment, the base 70 is fixed on one side of the zipper chain Z. In other words, the base 70 may be disposed on an end point and remains being at a fixed position. The zipper chain Z, the intelligent electronic lock 1, the slider 80 and the base 70 may be regarded as a zipper structure of the suitcase regarded as a single zipper. In another embodiment, the base 70 is slidably disposed on the zipper chain Z. In other words, the base 70 may slide on the zipper chain Z and serves as another slider. The zipper chain Z, the intelligent electronic lock 1, the slider 80 and the base 70 may be regarded as a zipper structure of the suitcase regarded as a double zipper.

Here, the process of the suitcase from the unlocking position to the locking position would be described as follows. As illustrated in FIG. 6A, the housing 10 of the intelligent electronic lock 1 is above the slider 80 and the housing 10 of the intelligent electronic lock 1 is rotated respective to the slider 80. The housing 10 of the intelligent electronic lock 1 is turned to one side adjacent to the base 70. The housing 10 of the intelligent electronic lock 1 is put in the groove 71. The first blocking element 60A and the second blocking element 60B do not pass through the first through hole 11A and the second through hole 11B and are in the accommodating space S. Namely, the first blocking element 60A and the second blocking element 60B are at their corresponding unlocking positions and the intelligent electronic lock 1 is accommodated in the groove 71. As illustrated by FIG. 6B, the first blocking element 60A and the second blocking element pass through the first through hole 11A and the second through hole 11B. The first blocking element 60A and the second blocking element 60B are engaged with the first hole 72A and the second hole 72B. Namely, the first blocking element 60A and the second blocking element 60B are at their corresponding locking positions. The intelligent electronic lock 1 is fixed in the groove 71 and a position of the slider 80 is fixed. The suitcase LA is locked.

On the contrary, when the intelligent electronic lock 1 is moved from the locking position to the unlocking position, the first blocking element 60A and the second blocking element 60B retract in the accommodating space S and are separated from the first hole 72A and the second hole 72B. At this time, an external force may be applied to the intelligent electronic lock 1 to rotate respective to the slider 80. The intelligent electronic lock 1 and the groove 71 are separated. The user may apply a pulling force to the intelligent electronic lock 1, the slider 80 slides on the zipper chain Z and the suitcase LA is open.

In the present embodiment, the reference identification information includes a reference code and a use record. The target identification information includes a target code and user data. For example, the use record may be a using situation of the intelligent electronic lock 1 used by the user and the reference code is a code provided by the microcontroller 40. The target code is a code transmitted from the mobile device M to the microcontroller 40. The user data is data related to the user of the mobile device M (such as name and phone number). The user may utilize the mobile device M to connect to the microcontroller 40. The user utilizes the mobile device M to set a reference code. The mobile device M may also receive the user data and the use record stored in the microcontroller 40.

In view of the above description, the intelligent electronic lock and the intelligent electronic lock assembly disclosed by the present disclosure utilizes the wireless sensor to sense the induction signal to generate the induction current, the induction current is distributed to the microcontroller and the driver by the current divider and is a power source of the microcontroller and the driver. Hence, there is no need to dispose the power (such as a battery) to make the microcontroller and the driver operate to elevate convenience of the intelligent electronic lock in use. The suitcase disclosed by the present disclosure with the aforementioned intelligent electronic lock assembly and has no disposal of power to conform to Civil Aviation Act.

What is claimed is:

1. An intelligent electronic lock, configured to receive a wireless signal comprising an identification signal and an induction signal, comprising:

a housing;

a wireless sensor disposed in the housing, configured to receive the identification signal and comprising an induction coil which senses the induction signal to generate an induction current;

a current divider electrically connected to the wireless sensor and distributing the induction current;

a microcontroller disposed in the housing, electrically connected to the wireless sensor and the current divider, provided with reference identification information and operated by part of the induction current, with the microcontroller obtaining target identification information from the identification signal and comparing the target identification information with the reference identification information to output a control signal;

a driver disposed in the housing, electrically connected to the microcontroller and the current divider and operated by part of the induction current; and at least one blocking element disposed in the housing and mechanically connected to the driver, with the driver driving the at least one blocking element to move between a locking position where the at least one blocking element protrudes out of the housing and an unlocking position where the at least one blocking element retracts in the housing according to the control signal;

wherein a number of the at least one blocking element is two, the at least one blocking element comprises a first blocking element and a second blocking element, the housing is provided with an accommodating space, a first through hole and a second through hole, the first through hole and the second through hole are disposed on two opposite sides of the housing and are connected to the accommodating space, the wireless sensor, the microcontroller and the driver are disposed in the accommodating space, the first blocking element and the second blocking element are in the accommodating space when being at the unlocking position and the first blocking element and the second blocking element protrude from the first through hole and the second through hole to an outer surface of the housing when being at the locking position.

2. The intelligent electronic lock according to claim 1, wherein the driver drives the at least one blocking element to move from the locking position to the unlocking position or to move from the unlocking position to the locking position according to the control signal when the target identification information matches the reference identification information.

3. The intelligent electronic lock according to claim 1, wherein the at least one blocking element remains being at the locking position or the unlocking position when the target identification information does not match the reference identification information.

4. An intelligent electronic lock assembly, configured to receive a wireless signal comprising an identification signal and an induction signal, comprising:

the intelligent electronic lock according to claim 1; and a base comprising a groove where the intelligent electronic lock is separably disposed and at least one hole disposed on a sidewall of the groove, wherein the at least one blocking element is separated from the at least one hole when being at the unlocking position, and the at least one blocking element is engaged with the at least one hole when being at the locking position.

5. A suitcase comprising:

a case body comprising a zipper chain; and the intelligent electronic lock assembly according to claim 4 disposed on the zipper chain.

6. The suitcase according to claim 5, further comprising a slider slidably disposed on the zipper chain, wherein the intelligent electronic lock is rotatably disposed on the slider.

7. The suitcase according to claim 5, wherein the base is fixed on one of two sides of the zipper chain.

8. The suitcase according to claim 5, wherein the base is slidably disposed on the zipper chain.

* * * * *